(No Model.) 3 Sheets—Sheet 1.
F. G. FOWLER.
AUTOMATIC VACUUM REGULATOR FOR BOILER FEEDING.
No. 462,351. Patented Nov. 3, 1891.

WITNESSES:
Henry A. Lambert
Theodore J. Coe

INVENTOR:
Frank G. Fowler (No Model.)  3 Sheets—Sheet 2.
F. G. FOWLER.
AUTOMATIC VACUUM REGULATOR FOR BOILER FEEDING.
No. 462,351. Patented Nov. 3, 1891.
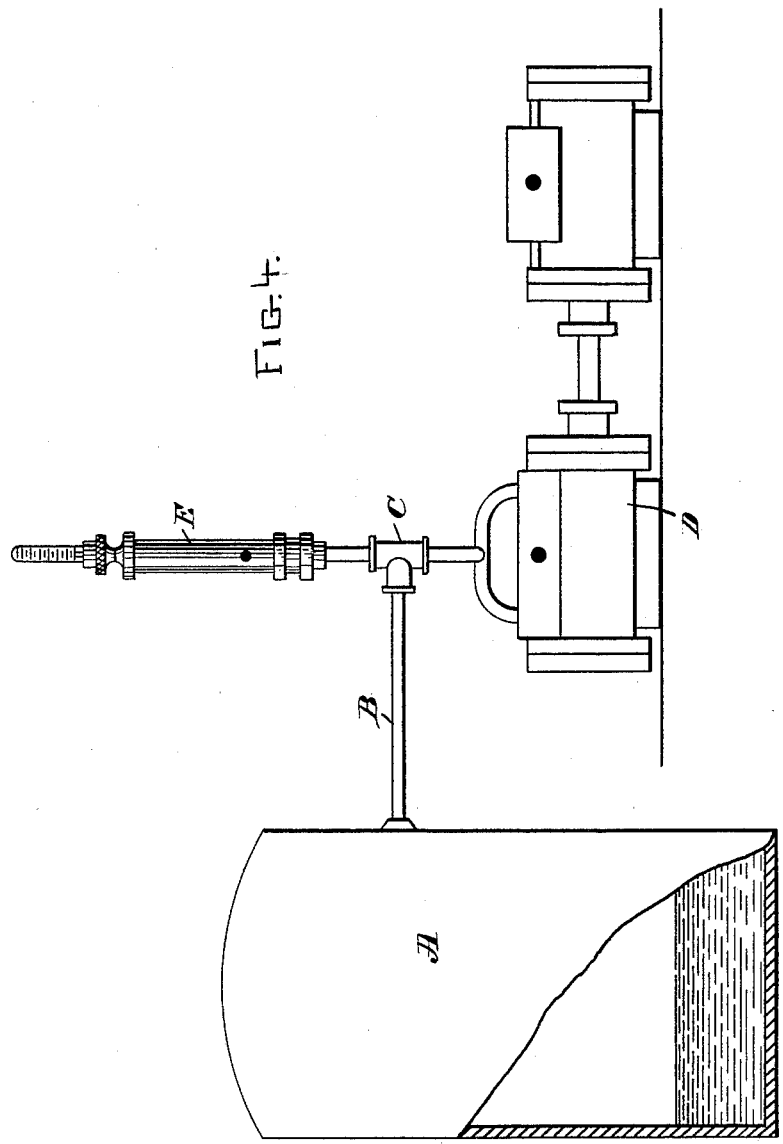
WITNESSES:
Henry A. Lambert
Theodore I. Coe
INVENTOR:
Frank G. Fowler (No Model.) 3 Sheets—Sheet 3.
F. G. FOWLER.
AUTOMATIC VACUUM REGULATOR FOR BOILER FEEDING.
No. 462,351. Patented Nov. 3, 1891.
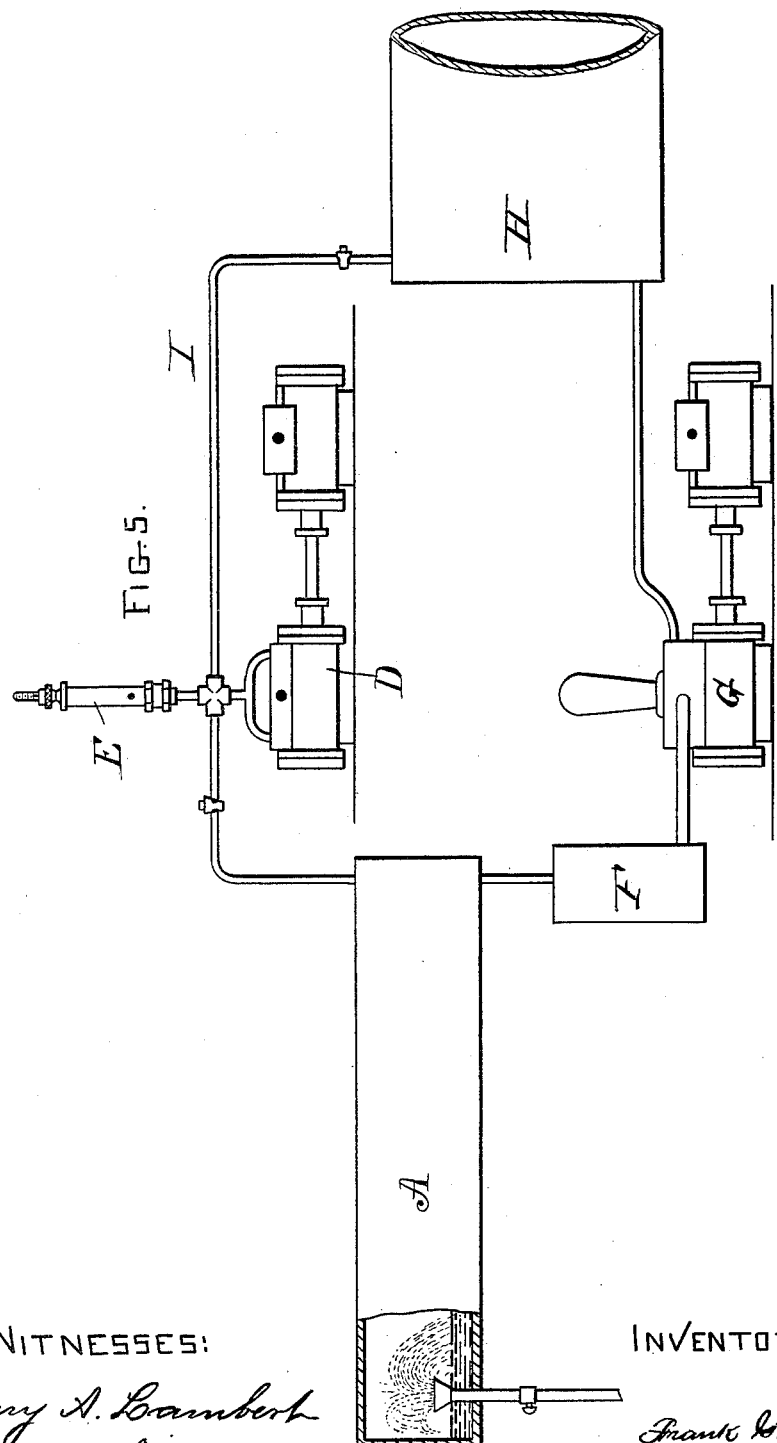
WITNESSES:
Henry A. Lambert
Theodore I. Coe
INVENTOR:
Frank G. Fowler

UNITED STATES PATENT OFFICE.

FRANK G. FOWLER, OF BRIDGEPORT, CONNECTICUT.

AUTOMATIC VACUUM-REGULATOR FOR BOILER-FEEDING.

SPECIFICATION forming part of Letters Patent No. 462,351, dated November 3, 1891.

Application filed April 13, 1891. Serial No. 388,685. (No model.)

*To all whom it may concern:*

Be it known that I, FRANK G. FOWLER, of Bridgeport, in the State of Connecticut, and a citizen of the United States, have invented a new and useful Automatic Vacuum-Regulator for Boiler-Feeders, of which the following is a description.

The primary object of my invention is to maintain a constant and uniform vacuum in a reservoir or any other vessel where such vacuum is produced, for the purpose of separating gaseous from liquid substances, or two liquids that have a different boiling-point. Not only do different liquids boil at different temperatures, but the boiling-point becomes higher or lower, as the weight of the atmosphere or the degree of vacuum in which such boiling takes place is greater or less, and it often happens that where the temperature of a liquid cannot be easily increased, so as to bring it at or near the boiling-point, such result can be obtained by placing it in a vacuum of a certain degree. The difficulty heretofore has been to maintain just the requisite vacuum. If the vacuum be too low, the substances will not separate. If the vacuum be too high, the boiling will be too violent, and both substances will pass over; but my invention obviates these difficulties and maintains a constant and uniform vacuum.

Having stated the general nature of my invention, I will now describe a form of apparatus by which it may be applied to use; but it should be understood that I do not limit myself to the form of apparatus described, since I believe my invention to be broader than any form of an apparatus and be capable of embodiment in a great variety of forms.

Figure 1:
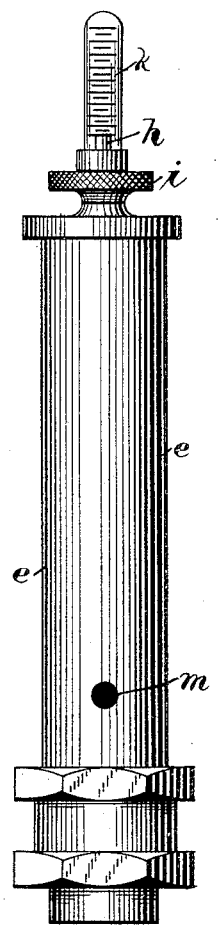
Figure 3:
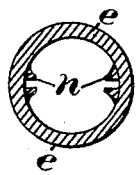
Figure 2:
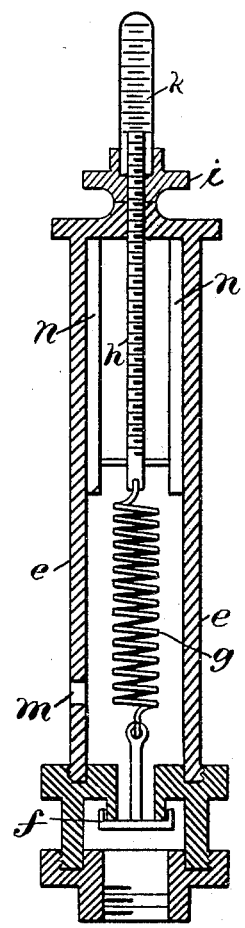

In the accompanying drawings, Figure 1 is a side elevation of my automatic vacuum-regulator. Fig. 2 is a vertical section of the same. Fig. 3 is a horizontal section of a portion of the same. Fig. 4 is a diagram showing a general arrangement of apparatus by which my invention may be practiced. Fig. 5 is a diagram showing an additional application of my invention.

$e$ is a tube provided at its lower end with a valve $f$. It is held in position against its seat by the spiral spring $g$. To the upper end of the spiral spring $g$ is attached the adjusting-screw $h$, which is provided at its upper end with a nut $i$, the arrangement being such that by turning the nut $i$ the tension of the spring and the pressure of the valve upon its seat may be increased or diminished. In lieu of the spring a weight may be used; but the spring is preferred.

Rising above the upper end of the adjusting-screw $h$ is the glass tube $k$, secured to the nut $i$ and marked with a graduated scale, adjacent to and showing the comparative rise and fall of the screw $h$ as the nut $i$ is turned in either direction.

$m$ represents an orifice in the tube $e$, which may be so formed as to emit a whistling sound when the air is drawn rapidly through it. The tube is also provided with the guides $n$, which prevent the screw $h$ from rotating upon its axis as the nut $i$ is turned.

A, Fig. 4, is a reservoir or closed vessel containing any substance desired, either liquid, solid, or gaseous. B is a pipe connecting the reservoir A and the three-way pipe connection C. To the lower extremity of this three-way connection is attached the suction of the air-pump D, and to its upper extremity is attached the vacuum-regulator E, which is shown in detail in Figs. 1, 2, and 3, above described.

The operation is as follows: If it is required to carry a vacuum of ten pounds in the vessel A, the nut $i$ is turned till the screw $h$ indicates the point on the graduated scale $k$ which denotes a pressure of ten pounds per square inch on the valve $f$. The air-pump D is then started and the vacuum begins to form. When the vacuum reaches ten pounds in the reservoir A, the pressure of the external atmosphere overcomes the tension of the spring $g$ and the valve $f$ is lifted from its seat, admitting the air, which passes into the air-pump D, causing it to draw less from the vessel A and preventing further rise of the vacuum. If the vacuum should fall below ten pounds, the valve $f$ would be automatically closed by the spring $g$, and the pump D would then begin to draw more from the reservoir A. In this way the vacuum is constantly maintained at ten pounds. Any other degree of vacuum can be secured by properly adjusting the screw $h$ to the scale $k$. In case the air-pump D is running more rapidly than is required, so as to cause a larger amount of air to pass through the orifice $m$ than is essential to maintain the vacuum, it will be indicated by the whistle sounding, and the attendant is notified that the speed of his air-pump can be decreased.

Another application of my automatic vacuum-regulator, to which I will now refer, is to the purpose described in my patent, No. 346,198, under date of July 27, 1886, which consists, substantially, in separating the gases from the feed-water before it is used to produce steam, and it will be understood by reference to Fig. 5, in which F represents a storage-tank; G, a feed-pump; H, a boiler, and I a pipe connecting the boiler to the air-pump for the purpose of removing the gases from the water in the boiler when it is filled anew. The temperature of the feed-water of boilers may vary from 100° to 200° Fahrenheit in different steam-plants, and each variation of the heat of the feed-water requires a corresponding variation in the degree of vacuum. It is impossible to adjust the speed of the air-pump D to give just the required degree of vacuum. If the degree of the vacuum is too low, the gases will not be separated from the water. If the degree of the vacuum is too high, the water will boil, so that it cannot be pumped by the feed-pump, as the suction will be filled with steam instead of water, and the pump is liable to be damaged by violent thumping. Steam will also be carried over into the air-pump, resulting in unnecessary waste of heat, all of which will be prevented by carrying a requisite degree of vacuum, which is accomplished by connecting the automatic vacuum-regulator E, as shown in Fig. 5.

I claim as my invention—

1. The closed feed-water receptacle A, air-pump D, and vacuum-regulator E, consisting of the tube $e$, having an opening at the bottom controlled by the spring-valve $f$, all connected, combined, and arranged as shown, whereby a constant vacuum of any desired degree is maintained in the receptacle A, substantially as shown.

2. The closed feed-water receptacle A, air-pump D, and adjustable spring-valve $f$, all connected and arranged substantially as set forth.

3. The closed feed-water receptacle A, air-pump D, vacuum-regulator E, feed-pump G, and boiler H, all connected, arranged, and operating as shown.

F. G. FOWLER.

In presence of—
 A. M. TALLMADGE,
 HOWARD N. WAKEMAN.